No. 869,360. PATENTED OCT. 29, 1907.
A. J. GARVER.
ORE ROASTER.
APPLICATION FILED JULY 26, 1906.

2 SHEETS—SHEET 1.

WITNESSES
W. C. Abbott
Walton Harrison

INVENTOR
Allen J. Garver
BY
Munn & Co
ATTORNEYS

No. 869,360. PATENTED OCT. 29, 1907.
A. J. GARVER.
ORE ROASTER.
APPLICATION FILED JULY 26, 1906.

2 SHEETS—SHEET 2.

WITNESSES
W. C. Abbott
W. Harrison.

INVENTOR
Allen J. Garver
BY Munn & Co
ATTORNEYS

UNITED STATES PATENT OFFICE.

ALLEN J. GARVER, OF CLARKSTON, WASHINGTON, ASSIGNOR TO HIMSELF AND JONATHAN McASSEY, OF CLARKSTON, WASHINGTON.

ORE-ROASTER.

No. 869,360.  Specification of Letters Patent.  Patented Oct. 29, 1907.

Application filed July 26, 1906. Serial No. 327,852.

*To all whom it may concern:*

Be it known that I, ALLEN J. GARVER, a citizen of the United States, and a resident of Clarkston, in the county of Asotin and State of Washington, have invented a new and Improved Ore-Roaster, of which the following is a full, clear, and exact description.

My invention relates to roasters of the kind used in treating ores, and more particularly ores containing sulfur. I seek to provide a roaster of simple form, which is self-feeding, self-agitating and self-emptying.

My invention further relates to certain details of construction whereby the general efficiency of the roaster is improved.

Reference is to be had to the accompanying drawings forming a part of this specification, in which similar characters of reference indicate corresponding parts in all the figures.

Figure 1:
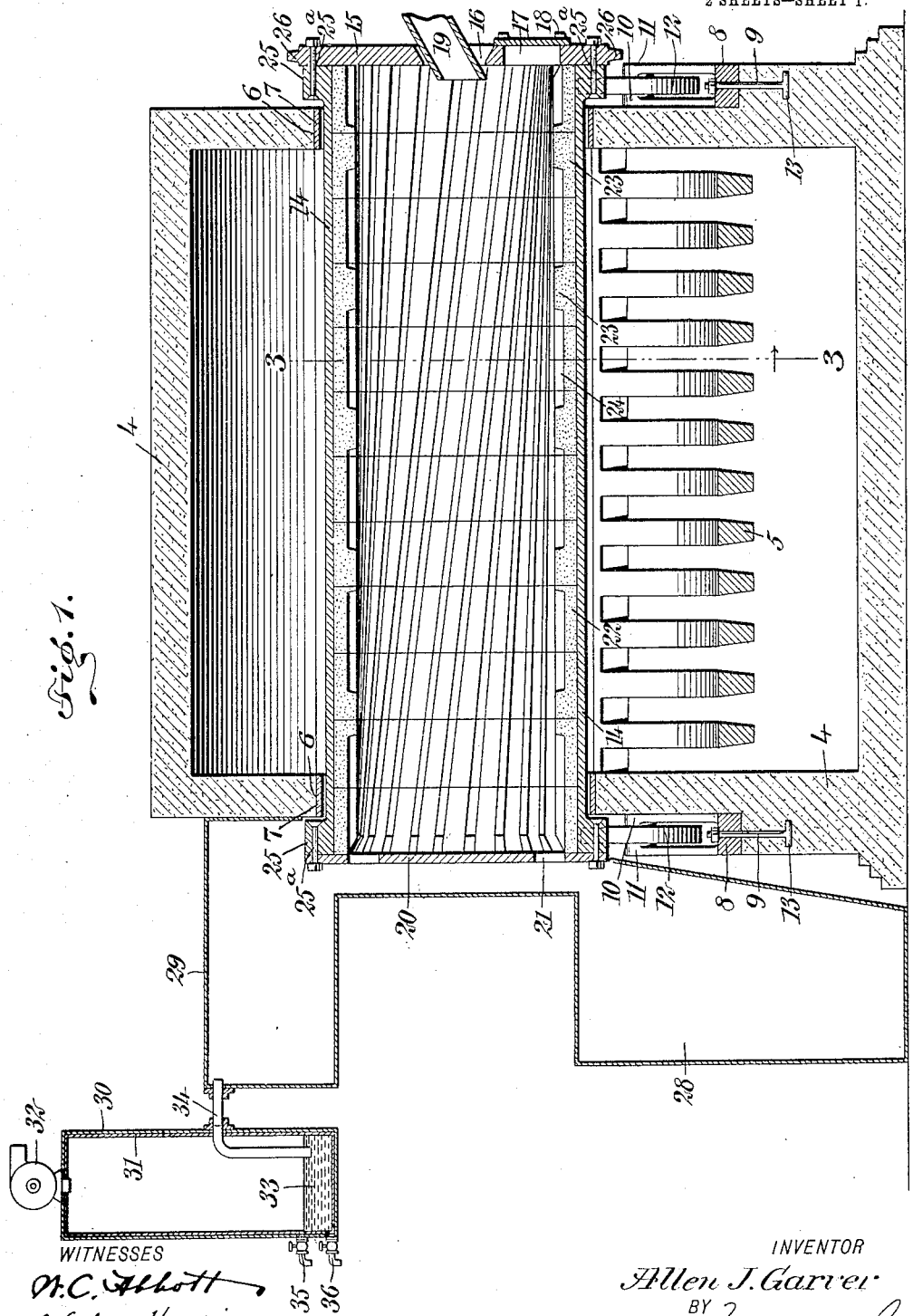
Figure 2:
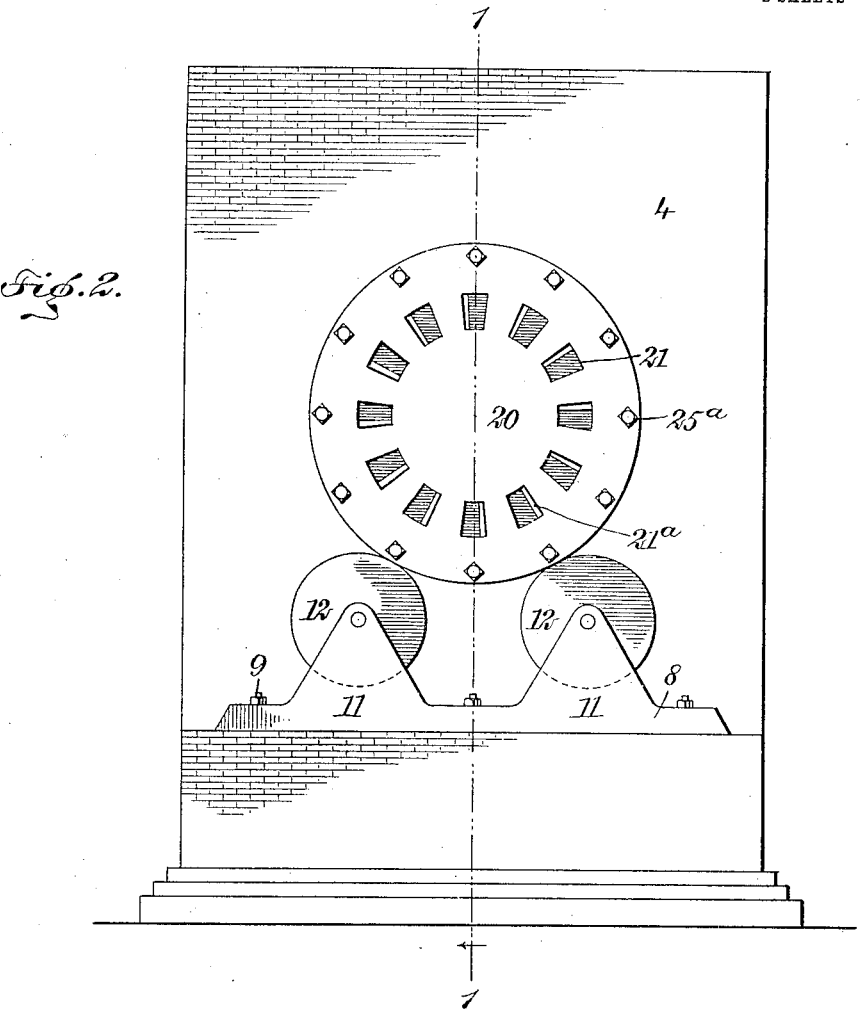
Figure 3:
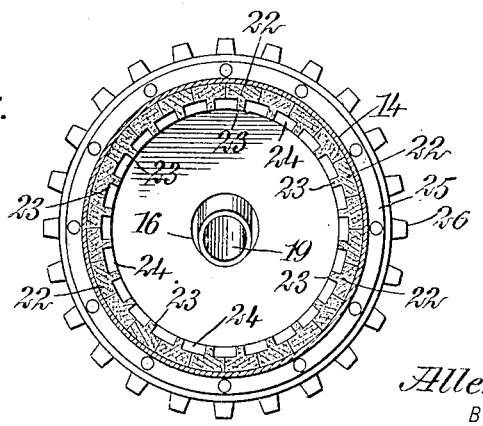

Figure 1 is a vertical section through a roaster embodying my invention, taken substantially on the line 1—1 in Fig. 2; Fig. 2 is an end elevation showing the roaster as viewed from the left of Fig. 1, the hood 29, chute 28 and certain other parts being removed; and Fig. 3 is a vertical section upon the line 3—3 of Fig. 1, looking in the direction of the arrow, and showing the fire-proof cylinder provided with spiral conveyer threads for the purpose of more efficiently handling the ore.

An oven 4, built of brick or other fire-proof material, is provided with a semi-circular grate 5, upon which the fuel is adapted to rest. Each end of the oven is provided with circular apertures 6, fitted with metallic linings 7. Mounted upon opposite sides of the oven are bosses 8 secured thereto by means of bolts 9, and provided with bearings 10, 11. Bearing rollers or wheels 12 are revolubly supported upon these bearings. The bolts 9 are provided with anchorages 13, which are firmly embedded within the walls of the oven 4. A cylinder 14, made preferably of cast iron, is provided at one of its ends with a cylinder head 15 having the form of a wheel, and this wheel is provided with a central aperture 16 of circular form. The wheel is further provided with a manhole 17, secured in position by means of bolts 18 or other suitable fastenings. An inlet chute shown at 19 is used for the purpose of feeding ore into the cylinder 14 through the aperture 16. Another cylinder head 20 is mounted upon the opposite end of the cylinder 14, and is provided with spaced apertures 21 disposed in the form of a circle, as indicated in Fig. 2. Each aperture 21 is bounded in part by a bevel edge 21ª, as indicated in Fig. 2. The cylinder 14 is lined internally with bricks 22, each having generally the form of a sector and each being provided with a raised thread 23, slightly askew relatively to the general position of the brick. These raised threads are so arranged that when the bricks are placed in position, the threads of successive bricks virtually constitute a single thread of greater length. In other words, the several fragmentary threads 23, carried by a series of bricks, are arranged in a definite order, so as to build up threads extending practically throughout the entire length of the cylinder 14. Intermediate of the spiral threads thus formed, are spaces 24 of general spiral form.

Mounted upon the cylinder 14 and connected to the heads 15 and 20 by fastening devices 25ª, are bearing rings 25, which rest upon the bearing rollers 12 and support the weight of the cylinder. The cylinder head 15 is provided with teeth 26, thus constituting a sprocket wheel, which is used for rotating the cylinder.

The ore-bin is shown at 28. A dust chamber 29 projects over and partially incloses one end of the cylinder 14, and is connected with an acid chamber 30, the latter being provided internally with a lead lining 31. A fan 32 is mounted upon the acid chamber and is adapted to draw a partial vacuum therein. At 33 is shown a liquid, which, at the beginning of the operation is clear water, but which gradually absorbs the fumes from the burning sulfur and thus forms dilute sulfurous acid, the strength of which, of course, gradually increases. A bent pipe 34 is used in making the connection from the dust chamber to the acid chamber. This pipe dips downwardly to a point near the bottom of the acid chamber. Discharge valves are shown at 35, 36. The valve 36 is used for drawing off all of the sulfuric acid and the valve 35 for maintaining the acid at a certain level, so that the lower end of the pipe 34 just dips below the surface of the acid. Normally both valves 35, 36 are closed in order to prevent the ingress of air due to suction of the fan 32.

The operation of my device is as follows: A fire being built upon the grate 5 within the oven 4, the cylinder is heated continuously. Ore is fed through the inlet chute 19 and enters one end of the cylinder, and falls upon the refractory fire-proof brick lining. The cylinder being rotated by means of the sprocket teeth 26 in a clockwise direction, as seen from the right of Fig. 1, there is a tendency for the ore to be carried along slightly toward the left. Since, however, the pitch of the threads 23 is comparatively slight, the ore does not move rapidly toward the left but each particle of the ore is slightly lifted until near the top of the cylinder and then slides down toward the bottom, only to be carried up again, but this time a little further to the left. Every particle of ore is thus tumbled over and over, and brought into thorough contact with such air or gases as may be within the cylinder. The ore is thus gradually worked toward the left, and is also gradually heated as it passes through the cylinder. The ore is finally discharged through the apertures 21 into the ore bin 28, as indicated at the left of Fig. 1. During the revolution of the cylinder, the bevel edges 21ª and apertures 21 prevent the clogging of the material. That is to say, the rotation of the cylinder head 20 causes the bevel edges to form a distinct line of demarcation between the material within the cylinder and that which is passing out. During all this time, the fan 32 being in motion, a partial vacuum is continuously maintained within the chamber 30, and fumes of the burning sulfur are continuously drawn from the cylinder through apertures 21 into the hood 29, and thence through the liquid 33 into the chamber 30, being then discharged by action of the fan. During this step, the liquid 33 absorbs all the sulfurous components of the fumes, and in this manner the manufacture of sulfurous acid is carried on continuously. The ore, completely desulfurized and also deprived of all volatile substances and of all gaseous components which may be separated from other components by action of the heat, accumulates in the ore bin 28 and may then be worked up in any desired manner.

The power required for the rotation of the cylinder 14 is reduced to a minimum, for the reason that the bearing rollers 12 act after the manner of ball bearings but are considerably stronger and more simple in construction.

When desired the manhole 17 may be employed for obtaining entrance into the cylinder. The arcuate bricks 22 are interchangeable and may be removed one at a time so that the entire inner lining of the cylinder may be renewed either as a whole or in part.

Having thus described my invention, I claim as new and desire to secure by Letters Patent:

1. The combination of a cylinder, means for rotating the same, a cylinder head closing one end of said cylinder and provided with apertures and with bevel edges bounding said apertures, means for heating said cylinder, and an ore pan disposed adjacent to the path of travel of said apertures.

2. The combination of a revoluble cylinder, a cylinder head closing one end thereof, and provided with apertures and with bevel edges bounding said apertures, a dust-chamber partially inclosing said cylinder head and said cylinder, means for supplying ore into said cylinder, and an oven for heating said cylinder.

3. The combination of a revoluble cylinder, an oven encircling the same and extending along a considerable portion of said cylinder, a plurality of semi-circular grate bars disposed concentric to said cylinder and adapted to heat said oven, and means for turning said cylinder.

4. In a device of the character described, the combination of a cylinder provided with an inlet and with an outlet, means for turning said cylinder, and a fireproof lining for said cylinder, said fireproof lining being built up of separate bricks, each brick being provided with a portion having a slight inclination, said portion serving as a conveyer thread.

5. The combination of a revoluble cylinder, an oven encircling the same, grate bars of substantially semi-circular form mounted below said cylinder and approximately concentric thereto, and means for passing ore through said cylinder.

6. The combination of a revoluble cylinder, means for passing ore therethrough, an oven encircling said cylinder, and grate bars disposed within said oven and having a conformity relating to the general shape of said cylinder.

7. The combination of an oven, a revoluble cylinder mounted therein, and a lining for said cylinder, said lining being made of separate bricks, each brick having the form of a sector being provided with a fragmentary thread, the bricks being so arranged that several fragmentary threads are in alinement.

In testimony whereof I have signed my name to this specification in the presence of two subscribing witnesses.

ALLEN J. GARVER.

Witnesses:
E. J. DEWAR,
C. L. KEMP.